Figures 4, 5:
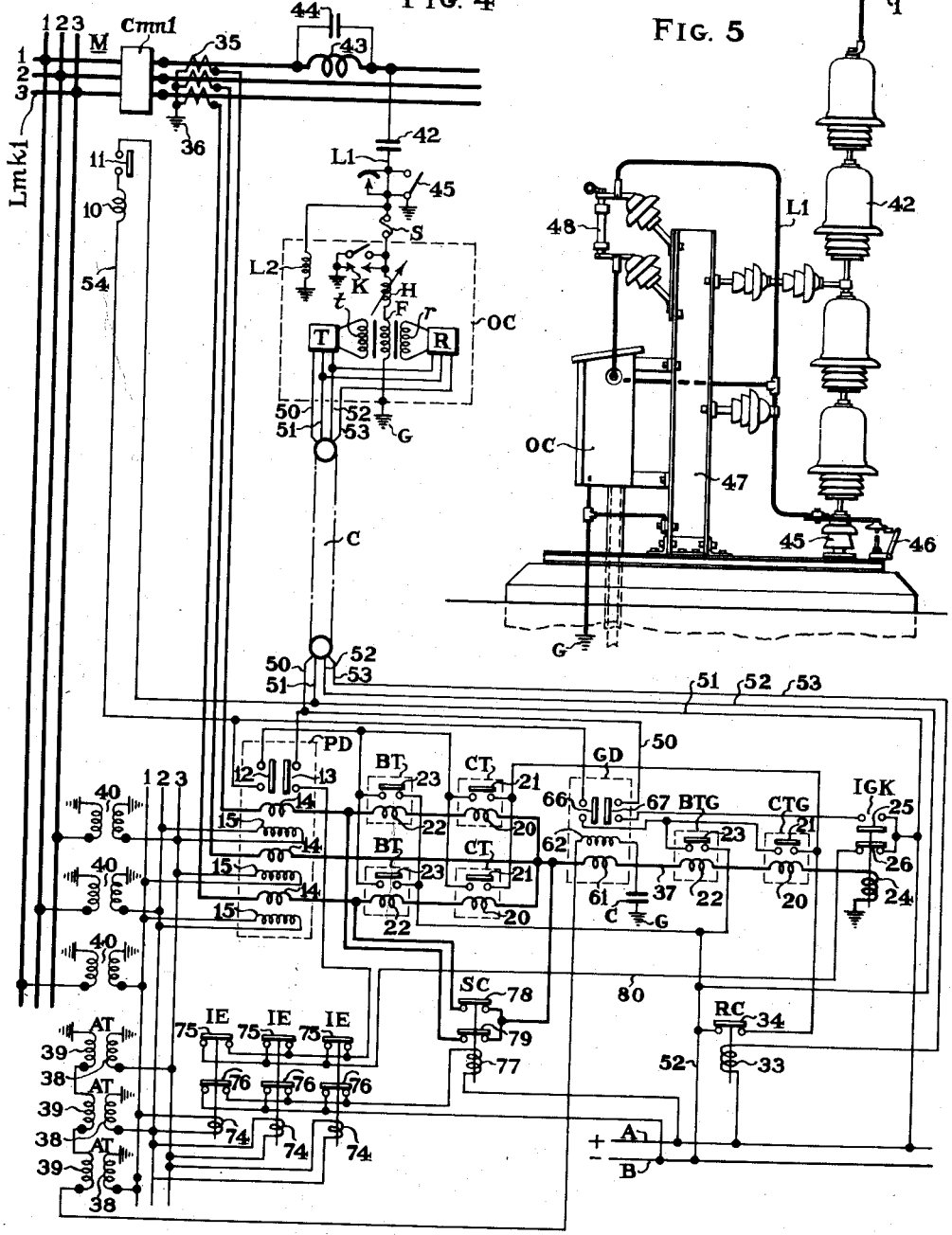

April 11, 1939.    P. SPORN ET AL    2,154,114
PROTECTIVE SYSTEM FOR ELECTRIC POWER TRANSMISSION LINES
Filed March 22, 1934    2 Sheets-Sheet 1
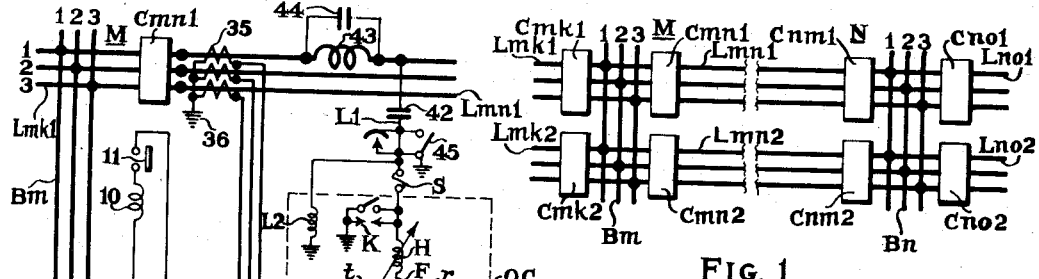
FIG. 1
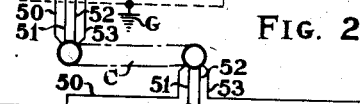
FIG. 2
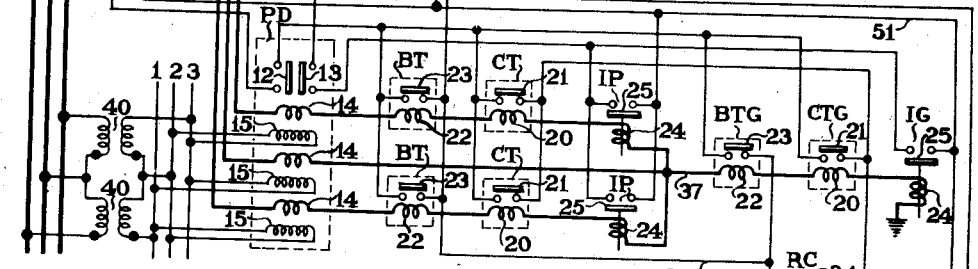
FIG. 3
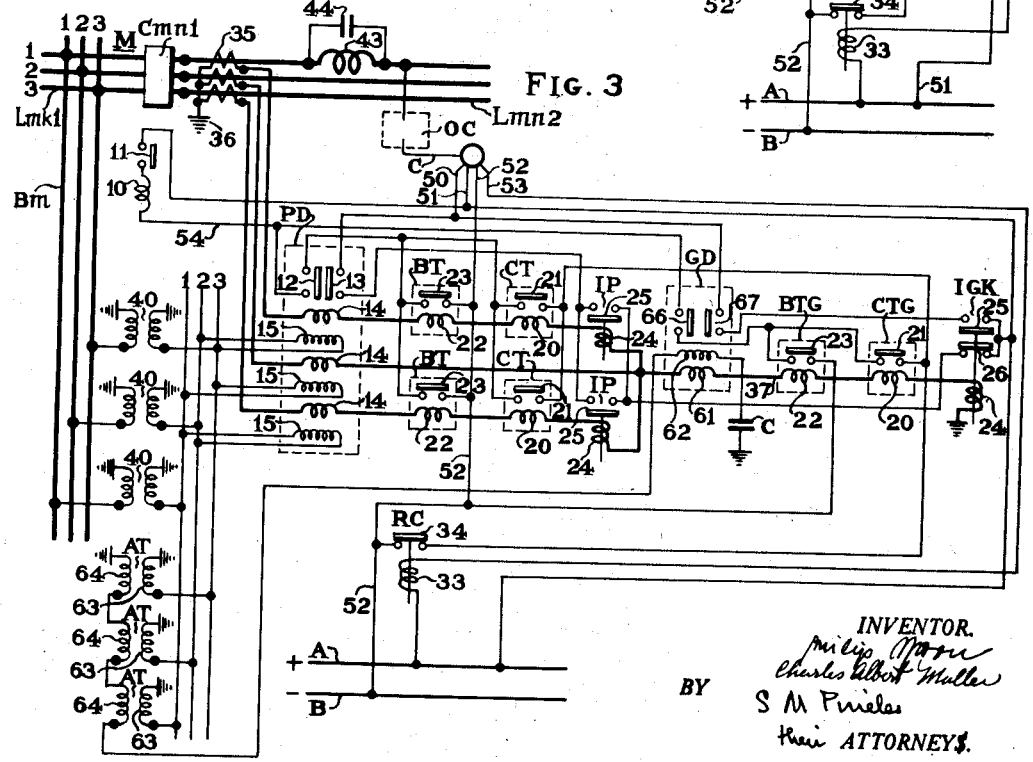
INVENTOR.
Philip Sporn
Charles Albert Muller
BY S M Pirielas
their ATTORNEYS.

Patented Apr. 11, 1939

2,154,114

UNITED STATES PATENT OFFICE 2,154,114

PROTECTIVE SYSTEM FOR ELECTRIC POWER TRANSMISSION LINES

Philip Sporn, Brooklyn, and Charles Albert Muller, Tuckahoe, N. Y.

Application March 22, 1934, Serial No. 716,798

10 Claims. (Cl. 175—294)

The present invention relates to protective systems for electric power transmission systems, and is a continuation in part of our copending application, Serial No. 584,936 filed January 6, 1932.

It is among the objects of the present invention to provide an improved fast- and positively-acting line protective system whereby on occurrence of a fault on an electric power transmission line circuit producing a dangerous flow of fault current, only the faulty section is cut out of the system, leaving the sound sections intact notwithstanding the flow of faulty current.

The foregoing and other objects of the invention will be best understood from the following description of its exemplifications, reference being had to the accompanying drawings, wherein Fig. 1 is a diagrammatic view of a part of an electric power transmission system to which the invention is applied;

Figs. 2, 3, and 4 are diagrammatic views of the protective equipment at the individual stations of the protective line sections of three types of the protective system illustrating embodiments of the invention; and Fig. 5 is a view of the mounting of the capacitor and the carrier equipment of the incoming power line section end in the switchyard of a high-voltage power station.

In Fig. 1 is shown a part of a typical transmission line system including line stations M, N, provided with bus bars $Bm$, $Bn$, respectively. A two circuit three-phase high voltage line extends between these stations. Two three-phase line sections $Lmk1$ and $Lmk2$, each comprising three-phase high voltage conductors 1, 2, 3, coming from an adjacent similar station K enter station M, being connected through circuit breakers $Cmk1$ and $Cmk2$ to the bus bars $Bm$ of station M; transmission line sections $Lmn1$ and $Lmn2$ extend between stations M and N and are connected to the bus bars $Bm$, $Bn$ at said stations through circuit breakers $Cmn1$, $Cmn2$, $Cnm1$, $Cnm2$; and two transmission line sections $Lno1$ and $Lno2$ leading to further stations are connected through circuit breakers $Cno1$ and $Cno2$ to the bus bars $Bn$ of station N. The two circuits of the line are thus formed of individual line sections that may be each separately cut out, so that in case of failure of one circuit line section, the entire load may be carried on the remaining circuit line section if it is left intact.

In accordance with the present invention, the transmission system is protected with carrier current control of the circuit breakers at each station of each line section in accordance with the direction of the power flow between the line section ends and the bus bars as determined by power directional relays, combined with back-up protection which assures cutting out of the line section under special conditions where the carrier current action will not function to trip out the faulty line section.

In the carrier current systems proposed prior to the present invention, the relay equipment for controlling the action of the carrier and the circuit breaker at the station, as well as the carrier current equipment including the transmitter, receiver, output transformer and line tuning equipment were mounted on a common switchboard panel inside the station house. This required long carrier leads between the point of connection of the carrier leads to the panel and point of connection of the carrier leads to the capacitors coupled to the power line conductors at the outdoor switchyard, usually about 800 to 1,000 feet away from the panel in the station house. The amount of carrier energy required by such equipment was relatively large and special rotary converters or similar generating equipment had to be used to apply alternating current for operating the carrier tubes, the plate and bias voltages being obtained by means of step-up transformers, rectifiers, and filter system. Since the converters had to operate continuously in order to have the apparatus always ready to operate, two duplicate converters had to be installed, one to act as a spare if the other should fail.

This inefficient and cumbersome arrangement is eliminated by the present invention through the separation of the carrier current equipment from the relay control equipment of the carrier, and mounting all the carrier equipment, including the transmitter, output transformer, line tuning equipment and the accessories in an outdoor cabinet next to the carrier coupling capacitor in the outdoor switchyard, at the point where the capacitor is connected to the incoming line end. This eliminates the long leads for transmitting the carrier between the capacitor mounted outdoors and the relatively far away transmitter and receiver carrier equipment mounted on the switchboard panel in the station.

The separation of the carrier current equipment from its relay control equipment, and the elimination of the long carrier leads, greatly reduces the amount of carrier energy required to maintain satisfactory carrier communication between the distant line stations, and make possible supply of direct current for the carrier equipment from the usually available station control battery which is a standard equipment of each power line station, direct current voltages for the transmitter in excess of the voltage of the local control battery required in some cases being readily supplied by a small booster battery. Improved carrier operation at a decrease of the required carrier power and simplification of the equipment and station layout, with great saving in costs and space requirements, is thus obtained.

In our new protective system, the carrier relay control equipment is combined in the station building on a single switchboard panel with back-up protective relay systems utilizing common relays for controlling the carrier protection as well as the back-up protection. There is obtained as a result a simple and effective protective system which not only gives quick carrier current protection, but also assures back-up protection of the power line system if the carrier protection should fail under special conditions that occur in modern interconnected line networks.

High speed clearing of line faults is essential on modern interconnected power systems because (a) it prevents unstabilization of the system by slow clearing and subjecting the whole system to enormous hazards and (b) it limits the duration of the voltage surges that may be produced by a fault discharge.

The principal requirements of protective systems for such interconnected modern power transmission systems are quick and positive localization of the trouble to the faulty section, and maintenance of the remainder of the transmission system in full and undisturbed operation. The apparatus relied upon for the protection must be simple, reliable and readily adjusted to varying operating conditions of the system and must not fail to carry out the duty imposed thereon within the short time assigned to it. Failure of such apparatus must be positively safeguarded and spread of troubles prevented.

To secure maximum of reliability, the protective system and its elements must act without indirectness, without intermediate chains of actions; they must avoid complications, and must be easy to supervise and to maintain in readiness for action.

We found that by discriminating between the various parts of a transmission system and by providing each part with a protective system which combines positive and fast and direct protecting action peculiar to its particular operating condition, a large transmission system can be protected to a much higher degree and in a much simpler way than by applying to the entire system to be protected a uniform type of protection.

Below are described three types of protective systems exemplifying our invention, by giving in connection with each exemplification a detailed description of the protective equipment applied to the connection of the end of a line section $Lmn1$ to the bus bars $Bm$ at station M by circuit breaker $Cmn1$ of a transmission line system indicated by Fig. 1. For the purposes of simplification, it is assumed that this line section is a part of a single circuit line including the line sections $Lmk1$ and $Lno1$. The protective equipment for each line connection at these stations would then be exactly like that used in connection with the circuit breaker $Cmn1$ as described below. Certain simplifications of the protective equipment may be made in cases where multiple line sections are connected to a single bus bar system of a station, and these will be explained in a subsequent part of this application.

In the first type of protective system of our invention shown in Fig. 2, the high-voltage circuit breaker $Cmn1$ connecting the three line conductors 1, 2 and 3 of section $Lmn1$ to the busses $Bm$ is of the usual type, and ordinarily consists of three separate oil circuit breaker units arranged to be actuated in common. The circuit breaker has a tripping coil 10 which trips the breaker upon being energized by current from a suitable source, such as the station control battery indicated by bus bars A and B. An auxiliary switch 11 is connected in series with the tripping coil 10 and arranged to be opened with the circuit breaker to deenergize the tripping coil when the circuit breaker is open.

The protection system according to the invention comprises the following cooperating relays which are preferably mounted on a switchboard panel located inside of the station house:

A. An instantaneous power directional phase relay PD arranged to be actuated to close its contacts 12 and to open its contacts 13 upon flow of power in the direction from the bus bars $Bm$ through the circuit breaker $Cmn1$ into the line section $Lmn1$, but to open its contacts 12 and to close its contacts 13 in case the power flows in opposite direction from the line $Lmn1$ into the bus bars $Bm$. The power directional relay PD has three current coils 14, and three voltage coils 15, the three sets of voltage and current coils acting inductively on suitably mounted discs to turn them in one or the opposite direction, depending on the direction of the power flow corresponding to the currents and voltages applied to the actuating coils 14 and 15. The type IDP polyphase, induction, power directional relay of the General Electric Company without voltage restraint is suitable for this service. This relay is highly sensitive, and operates at less than 1.0 amperes with only 10% of normal voltage and at less than 5.0 amperes with only 3% of normal voltage applied to the potential coil. It operates at high speed, requiring approximately 1 cycle for its operation.

The power directional relay PD is directly actuated by the alternating current flowing in the line making its operation fast, positive and reliable.

In the system of protection of Fig. 2, the power directional relay is employed for three different functions.

(1) For power flow from the line $Lmn1$ into the bus $Bm$, it closes one set of contacts 13 allowing the setting into action of the carrier transmitter T if the starting relay IP or IG has picked up, while another set of contacts 12 opens the tripping circuit of the local circuit breaker $Cmn1$.

(2) For power flow from bus $Bm$ into line $Lmn1$, one set of contacts 12 closes to allow tripping of circuit breaker $Cmn1$ by carrier tripping relay CT or CTG if no carrier is received at the station, while the other set of contacts 13 prevents transmission of carrier from local station.

(3) For power flow from bus $Bm$ into line $Lmn1$, one set of contacts 12 closes to allow tripping of circuit breaker $Cmn1$ by back-up protective relays BT or BTG after a predetermined time provided the fault on the system has not been cleared before this predetermined time has elapsed.

By using only one power directional relay actuated directly by the alternating current to per-form all of the foregoing various functions both for phase to phase and ground faults, a system of protection is obtained that is extremely fast, has a high degree of reliability, is very much simplified and is very economical.

The power directional relay PD is made to operate without voltage restraint because only by making it simple and free from the effect of voltage restraint coils on its disc movement, it is possible to give its action a high degree of sensitivity and high speed in clearing ground faults, and preventing the development of phase to phase faults as a result of slow clearing of ground faults.

Because of the use of a single power directional relay for the system to take care of both phase to phase and ground faults, the three phase currents and three phase to phase potentials are sufficient for its actuation. Hence only two high voltage potential transformers connected in open delta are necessary for obtaining the required phase to phase potentials for actuation of the power directional relay. If no high voltage potential transformers are available at the station, perfect operation of the power directional relay can be obtained by the use of low voltage potential transformers connected to the low tension bus bars.

The use of a power directional relay with voltage restraint has the following serious objections:

(a) Two power directional relays for phase protection are necessary, one to act as the starting relay and the other to act as the tripping relay.

(b) Not reliable for protection of ground faults due to high pick-up currents required to actuate the relay. This requires that two additional ground power directional relays must be employed for ground faults, one as the starting relay and the other as the tripping relay.

(c) Further, three expensive high voltage potential transformers connected in star with three auxiliary potential transformers for obtaining the necessary potential for the ground directional relays are absolutely necessary.

(d) Power directional relay with voltage restraint cannot give a definite current pick-up because its action depends upon voltage and current. Furthermore, the adjustable range of current pick-up at a definite voltage is very narrow and is limited to approximately a maximum pick-up current equal to 125% of the minimum current pick-up.

(e) Power directional relay with voltage restraint cannot give a definite time characteristic at all values of current because its action depends upon voltage and current. Furthermore, the adjustable range of time at a definite voltage is very small, from 1 to 3 cycles.

(f) The adjustments on a power directional relay with voltage restraint are very difficult to make for pick-up current and timing characteristics requiring very delicate adjustments similar to that encountered on a delicate watch.

(g) Power directional relays with voltage restraint are not of an equivalent degree of reliability for timing and pick-up characteristics compared with a power directional relay without voltage restraint used in coordination with separate current relays for these functions.

(h) Power directional relay with voltage restraint does not under operating set-ups give the same degree of reliability of maintaining service as a power directional relay without voltage restraint used in conjunction with separate over-current relays in that with loss of voltage restraint due to the blowing of a secondary fuse in the potential circuit, which is a very common occurrence, the circuit breaker will trip out giving an undesirable and unnecessary interruption in service.

B. A set of two definite-time-delay phase over-current tripping relays CT, and one similar ground-current tripping relay CTG, each having an actuating current coil 20 arranged to close its contacts 21 upon flow of a predetermined current in accordance with a predetermined time setting usually set from 2 to 4 cycles, are provided. These current tripping relays are of the induction time-delay type in which an alternating current energizes a magnet with shaded poles to impart movement to a disc which controls the contact closure. The type IAC–16 relays of the General Electric Company are well suited for this service. They are equipped with an adjustable time lever to readily adjust the relay to any definite time desired between the limits of 2 to 10 cycles. They are also equipped with ampere taps and a shading coil adjustment so as to obtain readily any predetermined current pick-up setting desired between the limits of a maximum current pick-up equal to three times the minimum current pick-up.

These current tripping relays are also directly actuated by the alternating current flowing in the lines making their operation positive, direct, fast and reliable. They are arranged to permit readily setting the relays for any predetermined current pick-up desired within a wide range of 3 to 1 ratio (for instance, from 5 amperes to 15 amperes). The time setting can be easily adjusted for any desired value between 2 to 10 cycles independently of the current pick-up adjustment, thus making its time-delay action independent of the current. By using such an independent tripping relay in connection with a power directional relay without voltage restraint, it is possible to make the time-delay for completing the tripping circuit only 2 to 3 cycles regardless of the magnitude of the fault current which would be practically prohibitive with any other arrangement. The time-delay for the tripping relays can be made definite and independent of the magnitude of the current causing the tripping action.

C. A set of two inverse time-delay back-up tripping phase over-current relays BT, and one similar back-up tripping ground relay BTG, each having an actuating current coil 22 arranged to close its contacts 23 upon flow of a predetermined current in accordance with a predetermined time setting which may vary between about 30 to 90 cycles. These over-current relays may also be of the induction time-delay type, and the type IAC–11 relays of the General Electric Company may be used for this service. They are equipped with an adjustable time lever to readily adjust the relay to any inverse time characteristic curve desired between the limits of 10 to 180 cycles at ten times pick-up current. They are also equipped with ampere taps and a shading coil adjustment so as to obtain readily any predetermined current pick-up setting desired between the limits of a maximum current pick-up equal to three times the minimum current pick-up.

These back-up relays are set to automatically close the tripping circuit of the circuit breaker at the station after a predetermined time of 30 to 90 cycles provided the local power directional relay has closed its tripping contacts in response to flow of current from line to bus. This makes the back-up tripping independent of the carrier operation and assures tripping of the breaker and protection of the system if the carrier control tripping relay fails to act because of a bus fault at the next station, or because a breaker at the next station fails to trip, and carrier is transmitted as it would be. By this arrangement of the back-up relays, the circuit breaker is tripped at the local station even if carrier opens the receiver relay contacts if fault currents continue to flow from the bus into the line beyond a predetermined time of 30 to 90 cycles.

D. A set of two instantaneously-acting phase starting relays IP, and one similar ground starting relay IG, each having an actuating current coil 24 arranged to close its contacts 25 upon flow of a predetermined current, are provided. These relays are of the plunger type, and very reliable, easy to maintain, and inexpensive. They are fast in operation, taking between 1 to 1.5 cycles to complete an operation. Their current setting is easily adjustable for any pick-up value and have a three to one range of adjustment, that is, the maximum current setting obtainable is equal to three times the minimum current setting obtainable. PQ relays of the General Electric Company and SC relays of the Westinghouse Company are suitable for this purpose.

By using an independent starting relay to start the transmitter when the current in the line exceeds a predetermined value subject to the control of the high speed, power directional relay enables the current setting of the starting relay to be made for a positive and definite pick-up current over a wide range from a maximum value equal to three times the minimum value. The relay is simple, easy to maintain and calibrate. It is also directly actuated by the alternating current flowing in the line making the operation positive, fast and reliable.

E. An instantaneous opening and time-delay closing receiver relay RC having an actuating coil 33 is arranged to open quickly its contacts 34 when energized by carrier energy and to close its contacts 34 with a predetermined time delay when the actuating coil 33 is de-energized. The receiver relay RC may be of the rotating armature type and constructed like the type RCC relays of the General Electric Company.

To energize the current coils of the power directional relay PD and the current relays CT, CTG, BT, BTG, IP and IG, there is provided a set of three current transformers 35 having the secondary windings connected in star, with the starpoint grounded at 36. The three current coils 14 of the power directional relay PD are connected in the three phase leads of the secondary windings of current transformer 35, while the coils 20 of two time-delay current relays CT, the coils 22 of two time-delay back-up current relays BT, and the coils 24 of the instantaneous phase current starting relays IP are connected in two phase leads from the transformer. The coils 20 and 22 of the ground time-delay relays CTG and BTG as well as coil 24 of the instantaneous ground starting relay IG are connected in the neutral grounded return lead 37 of the current transformers. The current transformers 35 are preferably made in the form of bushing current transformers in conjunction with the inlet bushings of the circuit breaker C$mn$ at the station, avoiding the use of separate instrument type current transformers.

The voltage coils 15 of the power directional relay PD are energized by two open delta connected potential transformers 40 having their primary windings connected to the bus bars B$m$ at the station. The phase sequence of the connections of the voltage coils 15 of the power directional relay PD is arranged to secure the proper directional action of the relays in response to the direction of the power flow.

An essential part of the protective system is the carrier frequency communication equipment which cooperates with the relays mounted on the switchboard. In accordance with our invention, the carrier equipment and all the parts carrying carrier current are left outside the station building and mounted in a weatherproof outdoor cabinet in the switchyard near the point where the carrier connection to the incoming high voltage line is made. The outdoor cabinet in which the carrier equipment is mounted is indicated in Fig. 2 by a dotted rectangle OC, and its arrangement as used in practice is shown in Fig. 5.

To obtain transmission of carrier over the power line section L$mn$1 between the opposite stations M, N, there is provided at each station a capacitor 42 which has its upper end connected to one of the line phases, phase 1, for instance, the lower end of the capacitor being grounded at G (Figs. 2 and 5). Although interphase coupling of the carrier apparatus was used in the prior art attempts to secure carrier protection systems, we found that excellent carrier communication and reduction of the required capacity may be obtained by phase-to-ground coupling with an arrangement at which the carrier equipment is placed close to the point where the coupling to the carrier line is made.

As shown in Fig. 5, the capacitor 42 may consist of several units assembled one on the top of the other into a stack. The top unit is shown connected through a copper lead to the incoming line phase conductor 1 of line section L$mn$1. As shown in Fig. 2, a wave trap consisting of an inductance 43 and a condenser 44 is interposed between the capacitor connection and the circuit breaker to prevent carrier from entering the adjacent line sections.

As shown in Fig. 5, the lowest unit of the capacitor stack is supported on insulator 45 mounted on a grounded base plate which is anchored in a concrete block set in the ground, a grounding switch 46 bridged by a safety gap serving to ground the lower terminal of the capacitor stack when needed. An iron framework 47, likewise supported on the ground, serves to support the capacitor stack at an intermediate point thereof, and has mounted thereon a weatherproof cabinet OC. A carrier conductor L1 connected to the low voltage terminal at the lower side of the lowest capacitor unit is insulatingly led over a fused disconnecting switch 48 into the interior of the cabinet OC. A separate lead from a point of the carrier conductor before the fuse switch is connected to the drain coil L2 in the cabinet OC. Inside the cabinet (see Fig. 2) the carrier conductor is provided with an additional combination gap and grounding switch assembly K and is connected in series with a tuning coil H and a coupling transformer winding F to the ground G to which the cabinet OC, the drain coil L2 and the ground sides of the gap switches are also connected. To the carrier transformer winding F is coupled by output winding $r$ and input winding $t$, carrier receiver R and transmitter T, respectively, all the leads and instruments through which carrier is flowing being thus confined to the point of coupling to the line and its immediate surrounding space. Tuning coil H serves to tune the circuit to the desired carrier frequency.

The details of construction of the receiver and transmitter do not constitute the subject matter of the present invention. They may have any of the different forms well known in the art in connection with carrier frequency transmission and reception, such apparatus being, for instance, described in our article on "Carrier Relaying Simplified" in the Electrical World of October 28, 1933, pages 556–560. No special modulation of the transmitted high frequency current is required in the protective systems described herein.

The capacitors may have the form described in the paper by P. Sporn and R. H. Wolford, "Experience with Carrier Current Communication", presented before the American Institute of Electrical Engineers in December, 1929, and printed in the publication of that institute.

The carrier frequency receiver R and transmitter T are of the well known types operating with three electrode vacuum tubes. The cathode circuits of the tubes used in the receiver and transmitter are continuously supplied with direct current from the station battery control busses A and B (see Fig. 2) by leads 51 and 52 passing through a lead covered cable C from the outdoor cabinet into the switchboard panel inside the station house. The plate circuit of transmitter T is supplied with direct current from the station control battery busses A and B through leads 50 and 52 of cable C when contacts 13 of directional relay PD and the contacts 25 of one of the two phase starting relays IP or ground starting relay IG are closed. The plate circuit of receiver R is continuously supplied with direct current potential from the station control battery busses A and B through leads 52 and 53 of the cable C. Coil 33 of receiver relay RC is included in the receiver plate circuit and the coil remains without current, keeping contacts 34 closed if no carrier is received, being energized and opening contacts 34 if carrier is received.

The transmitter circuit contacts 13 of the directional power relay PD close only when the direction of power flow in line section Lmn1 is from the line Lmn1 into the bus bars Bm. Since contacts 13 of the directional power relay PD are connected in series with the three parallel connected contacts 25 of the instantaneus phase and ground current starting relays IP and IG, carrier energy will not be transmitted at station M by transmitter T unless a phase current or the ground current has exceeded a predetermined value of normal current regardless of the direction and magnitude of the power flow in the line Lmn1.

The tripping circuit contacts 12 of the directional power relay PD close only when the direction of power flow in line section Lmn1 is from the bus bars Bm into the line Lmn1. Since contacts 12 of the directional power relay PD are connected in series, with the parallel connected contacts 21 of the definite-time-delay phase current relays CT and ground relay CTG connected in the phase leads and ground lead from current transformer 35 and contacts 34 of receiver relay RC, and independently in series with the parallel connected contacts 23 of the inverse time-delay phase current relays BT and ground current back-up relay BTG, the circuit breaker Cmn1 will not trip unless one of the phase currents or the ground current has increased above a predetermined value of normal regardless of the direction and magnitude of power flow in the line Lmn1.

By designating the contacts and actuating coils of the various relays by the symbol of the particular relay over the designating numeral of the particular contact or coil of the relay, the interaction between the various relays at each circuit breaker station may be summarized as follows:

Under normal line conditions the phase starting relay IP and the ground starting relay IG will have their starting contacts 25 open. The contacts 25 close instantaneously if the phase current or the ground current exceeds a predetermined amount, for instance, 25% above normal and establish instantaneously a starting circuit to the transmitter if the contacts PD/13 are closed in response to power flow from the line into the bus.

The carrier phase and ground tripping relays CT, CTG and the back-up phase and ground tripping relays BT, BTG have their contacts 21 and 23, respectively, normally open, and start to close upon increase of the phase and ground current, respectively, above a predetermined amount. The carrier relays complete the tripping circuit 54 after a short time delay only if the power directional contacts PD/12 and receiver relay contacts RC/34 are closed. The back-up relays BT and BTG complete the tripping circuit 54 after a delay of 30 to 90 cycles only if the power directional contacts PD/12 are closed.

The power directional relay PD closes its transmitter starting contacts PD/13 when power flows from the line into the bus, actuating transmitter T only if either IP/25 or IG/25 contacts are closed; and it closes its tripping contacts PD/12 when power flows from bus into line, actuating the tripping coil 10 only if either of contacts CT/21 or CTG/21 as well as RC/34 contacts are closed, or if either BT/23 or BTG/23 contacts are closed.

Tripping of the circuit breaker at each station by energization of trip coil 10 can accordingly take place only if a circuit, including the following alternative series of closed relay contacts, is established:
 (1) PD/12, CT/21, RC/34.
 (2) PD/12, CTG/21, RC/34.
 (3) PD/12, BT/23.
 (4) PD/12, BTG/23.
Relay actions which do not produce one of the foregoing four set-ups keep the circuit breaker from tripping.

If the local directional phase power relay has its tripping contact PD/12 closed indicating power flow from the bus into the line, tripping is normally delayed until the phase tripping relay CT has given its contacts CT/21 a time delay for the receiver relay RC to open its contacts RC/34 in response to carrier received from the other end station of the section. If for some cause, the carrier control fails to trip the breaker, the line current continuing to say above normal, the phase directional power relay PD holds closed its tripping contacts PD/12, the back-up relay will after a time delay of between 30 to 90 cycles, depending on its setting, trip the breaker.

Should the line have a ground fault and produce a ground current, and the local directional phase power relay has its tripping contact PD/12 closed indicating power flow from the bus into the line, tripping is normally delayed until the ground tripping relay CTG has given its contact CTG/21 a time delay for the receiver relay RC to open its contacts RC/34 in response to carrier received from the other end station of the section.

In like way, if for some cause the carrier control fails to trip the breaker, and the fault continues to be abnormal in the direction from the busses into the line, the phase directional power relay PD holds closed its tripping contact PD/12 and the ground back-up relay BTG will close its contact BTG/23 after a time delay of between 30 to 90 cycles, tripping the breaker.

The fast carrier control tripping action of the phase and ground short-time-delay tripping relays CT and CTG which is usually sufficient to take care of all troubles has thus a protective backing in the phase and ground back-up relays which finally trip the breaker if the phase or ground power flow is from the busses into the line.

Summarizing, the relay arrangement shown in Fig. 2 has the following essential and important features that make this system of protection far superior to any other system of carrier current protection heretofore proposed in obtaining greater speed of operation, greater reliability, greater flexibility, more efficient operation, ease of maintenance, and more economical installation:

(a) The arrangement by which the carrier current equipment, including transmitter, output transformer, line tuning equipment, and the accessories, are mounted in an outdoor cabinet OC next to the carrier coupling capacitor in the outdoor switchyard, and the relay control equipment is mounted on a switchboard panel in the station, makes it possible to obtain a more efficient, simplified, and reliable arrangement in addition to obtaining great saving in cost and space requirements.

(b) The arrangement of one instantaneous-acting power directional relay PD without voltage restraint in coordination with three instantaneous-acting over-current starting relays IP, IG directly and simultaneously actuated from the alternating current in the line, makes it possible to start the transmission of carrier current from 1 to 1½ cycles on an external fault after a fault occurs. Also, on an external fault carrier current will be received at the station where the flow of fault current is from the bus bars into the line within 1½ to 2 cycles after the fault occurs.

(c) The arrangement of one instantaneous-acting power directional relay PD without voltage restraint in coordination with three instantaneous-acting over-current starting relays IP, IG and three definite-time over-current tripping relays CT, CTG directly and simultaneously actuated from the alternating current in the line, makes it possible on an internal fault to cause energization of the trip coil of the circuit breakers at all terminals of the line section within 2½ to 3 cycles after the fault occurs.

(d) The arrangement of one instantaneous-acting power directional relay PD without voltage restraint in coordination with three instantaneous-acting over-current starting relays IP, IG and three definite-time over-current tripping relays CT, CTG, two of which are connected as phase relays and the third as a ground relay, directly and simultaneously actuated from the alternating current in the line, makes it possible for approximately 90% of the applications encountered in practice to give complete and fast protection for ground faults as well as for phase to phase faults, thus eliminating at least the expense of installation of the third high-voltage potential transformer and, if desirable, the complete installation of the three high voltage potential transformers by the employment of three low voltage potential transformers, as well as the elimination of ground directional relays with their auxiliary potential transformers.

(e) The arrangement of one instantaneous-acting power directional relay PD without voltage restraint in coordination with three inverse time over-current back-up tripping relays BT, BTG directly and simultaneously actuated from the alternating current in the line, makes it possible to obtain back-up protection in case the carrier protection fails to trip under certain special conditions.

(f) The arrangement of definite-time-delay over-current tripping relays CT, CTG makes it possible to trip out the faulty line section with the same speed both for ground and phase to phase faults regardless of the magnitude of the fault current.

(g) The arrangement of an adjustable time lever setting on the time-delay over-current tripping relays CT, CTG makes it possible to alter the time of tripping readily to meet various operating conditions met in practice within wide limits, that is, from 2 to 10 cycles.

(h) The arrangement of instantaneous current starting relays IP, IG with an easy adjustable current pick-up over wide limits, namely, from a minimum value to a maximum value equal to three times the minimum value, makes it possible to set the starting relays at any predetermined value over a wide range.

(i) The arrangement of current tripping relays CT, CTG, BT, BTG, equipped with current taps and an adjustable shading-pole adjustment makes it possible to set the tripping relays for pick-up current at any predetermined value readily over a wide range, namely, from a minimum value to a maximum value equal to three times the minimum value.

(j) The relays required with this arrangement are all very simple, extremely reliable, require very little maintenance, and are rather inexpensive.

Assuming now a single circuit line including sections L*mk*l, L*mn*l and L*no*l, the circuit breakers at each station being equipped as described in connection with Figs. 2 and 5, hereinabove, the operation of the system will be as follows:

Let it be assumed that the transmission line sections are all intact and that most of the time there is normal power flow along the transmission line from line sections L*mk*l by way of station M through line sections L*mn*l, through station N into line section L*no*l, and from there through to other stations. So long as the magnitude of power flow over line sections L*mn*l is not abnormal, no carrier current will be transmitted or received at either stations, nor will any circuit breakers at either stations trip.

If a phase to phase fault, such as a short circuit, occurs on the line section L*no*l, beyond station N, an abnormal current flow will ensue from line sections L*mk*l through line L*mn*l and the portion of the line section leading from station N to the point of short circuit on line L*no*l. This abnormal current will immediately actuate at each of the two stations M, N, the instantaneously-acting phase starting relays IP and high speed power directional relay PD, and also start the action of the short-time-delay carrier tripping phase current relays CT and the long-time-delay back-up tripping relay BT.

At station M the power flows from bus bar B$m$ into the line L$mn$ I and causes the high speed power directional relay PD to quickly close its tripping contacts 12 preparing the tripping circuit and hold open the transmitter contacts PD/13 preventing transmission of carrier from the station. At station N the power flows from the line L$mn$ I into the bus bars B$n$, causing the high speed power directional relay PD to quickly close its transmitter contacts PD/13 and prepare the transmitter circuit to start the carrier transmitter by completing its supply circuit instantaneously closed by the simultaneous actuation of the local phase starting relay IP to close its contacts IP/24, while the local tripping circuit is held opened at the power directional relay contacts PD/12. The transmitter at station N is thus quickly started at the very inception of the fault and energizes by carrier flowing over the line section to the receiver relay RC at station M, opening the latter in time before the associated short-time-delay relay CT had time to close its contacts CT/21. Tripping of the breaker C$mn$ I at station M is thus prevented by the open contacts RC/34 of the carrier receiver relay. The line section stays intact.

Should the fault on line section L$no$ I be a phase to ground fault, then a zero sequence ground current will flow from station M through line L$mn$ I, through station N and through line L$no$ I to the fault. This ground current will immediately actuate at each of the two stations M and N the instantaneously-acting ground starting relays IG and the high speed power directional relay PD, and also start the action of the short-time-delay carrier tripping ground current relay CTG and the long-time-delay back-up ground relay BTG.

At station M the ground current flows from the bus B$m$ into the line L$mn$ I and causes the high speed power directional relay to quickly close its tripping contacts 12 preparing the tripping circuit and holding open the transmitter contacts PD/13 preventing transmission of carrier from the station. At station N the ground current flows from the line L$mn$ I into the bus bar B$n$ causing the high speed power directional relay PD to quickly close its transmitter contacts PD/13 and prepare the transmitter circuit to start the carrier transmitter by completing its circuit upon instantaneous closure of the starting relay contacts IG/25, coil 24 of which has been simultaneously actuated, while the local tripping circuit is held open at the power directional relay contacts PD/12. The transmitter at station N is thus quickly started at the very inception of the fault and energizes by carrier flowing over line section L$mn$ I to the receiver relay RC at M opening the latter in time before the associated short-time-delay carrier relay CTG had time to close its contacts CTG/21. Tripping of the breaker C$mn$ I is thus prevented by the open contacts RC/34 and the line section stays intact.

If a phase to phase fault occurs on the line section L$mn$ I between stations M and N, an abnormal current flow will ensue from the bus bars B$m$ at station M and from bus bars B$n$ of station N into the line section L$mn$ I to the point of fault. This abnormal current will immediately actuate at each of the two stations the high speed power directional relay PD and also start the action of the short-time-delay carrier tripping phase current relays CT and the long-time-delay back-up tripping relay BT.

Since at both stations M and N the power now flows from the bus bars into the line L$mn$ I, the high speed power directional relays PD at both stations quickly close their tripping contacts 12 preparing their tripping circuits and holding open the transmitter contacts PD/13, thus preventing transmission of carrier from the two stations. The short-time-delay tripping relays at both stations will continue their closing movement and will complete in both stations the tripping circuit to coil 10 of its circuit breaker because no carrier is received at any of the stations, resulting in prompt tripping of the two circuit breakers C$mn$ I and C$nm$ I at the two stations and cut out the faulty section.

On a transmission network where it is desirable to use carrier current protection, it is common practice to use some form of back-up protection in addition to carrier current protection for the following reasons:

(a) When the carrier current protective system is taken out of service for maintenance or due to an emergency operating set-up, it is very desirable under this condition to employ the back-up protective relays for protection of the lines during this period.

(b) If a bus fault occurred at a station not protected by bus differential protection, the lines feeding this station if equipped only with carrier current protection would not trip, since this type of fault is equivalent to an external fault on the line section.

(c) Further, if a breaker at a station failed to trip due to either mechanical trouble with the breaker or an open trip coil circuit, the lines feeding this station if equipped only with carrier current protection would not trip, since this type of fault is equivalent to an external fault on the line section.

If any of the foregoing types of faults occurred then the carrier current tripping relays would not trip the circuit breakers but the back-up relays would come into action. Depending on the nature of the fault, whether it was a phase to phase or ground fault, either the back-up phase and ground relays which is independent of the carrier would operate after a time between 30 to 90 cycles and would trip the circuit breakers at those adjacent stations where the power flow was from the bus bars into the line.

In case a phase to ground fault should occur on section L$mn$ I, the high speed power directional relays PD at both stations will quickly close their tripping relay contacts 12 and open their transmitter contacts 13 and simultaneously set into action the short-time-delay carrier tripping ground relay CTG and the back-up ground tripping relay BTG causing their closure and tripping of the two circuit breakers at the end of the short time-delay of about 3 cycles because no transmission takes place from the transmitters at the two stations, thus cutting out the faulty section.

The system shown in Fig. 2 will also give perfect protection in case there is only a generating source from one side of the system and will not cause opening of the circuit breakers at either end of a line section if the fault lies beyond the line section where no generating capacity is available. It further will open the circuit breaker on the source end of the line section in case the fault is on the line secton because in case of such a fault no power flow will take place at the far station, hence no carrier current will be transmitted by this station to prevent the circuit breaker at the other station from tripping.

By providing at each of the circuit breaker connections of the bus bar to the line section ends of a transmission line system a protective equipment like that disclosed in connection with Figs. 2 and 5, lines and line networks composed of single circuit sections as well as double circuit sections will receive effective and sensitive carrier protection for quickly clearing only the faulty section, and keeping the remainder of the power transmission system in operating condition notwithstanding momentary flow of heavy short circuit currents over sound sections. By combining the carrier protection with back-up protection into a simplified protection system for reliable fast clearing of line sections having a phase or ground fault by carrier transmission without interrupting the operation on the sound lines of system carrying the heavy fault currents, with assurance of the clearance of the faulty section by back-up protection irrespective of some occasional deficiency that might affect the carrier operation, the efficiency of electric power systems is greatly increased and great economies in their construction, operation and upkeep obtained.

The protective system shown in Figs. 2 and 5 is very simple, extremely reliable and very flexible for carrier current and back-up protection. This system can be employed in the great majority of applications. Experience shows that in about 90% of power line sections for which carrier protection is desirable, a three phase directional relay will take care of phase to phase as well as ground faults. This enables dispensing with the ground directional relay and auxiliary phase potential transformers and one high voltage transformer and results in very considerable reduction of the cost of installation by several thousand dollars per high voltage station.

In this system one power directional relay takes care of control of starting the transmitter as well as of the control of the carrier tripping relay circuit and the back-up relay protection. By using a power directional relay without voltage restraint, the system enables to give complete protection against phase to phase as well as ground faults in most applications because the absence of the voltage restraint renders the power directional relay more sensitive to ground faults. It is thus possible to obtain with one high speed power directional relay control of phase faults and particularly also high speed clearing of ground faults which in turn eliminates a great many of the phase faults that are caused by initial ground faults.

Experience shows that on solidly grounded systems the magnitude of the current in case of a ground fault is more than twice the normal maximum line current in 90% of line sections for which carrier protection is desirable. In all such cases a single three phase power directional relay will always give correct response and it will make it unnecessary to use more complicated arrangements with more power directional relays which increases the space, the cost and the supervision of the protective equipment. Such relay as used in the system shown in Fig. 1 takes care of three phase, phase to phase as well as phase to ground faults. Its operation is much superior than that of power directional relays having voltage restraint because the use of an independent time-delay current tripping relay makes it possible to adjust the current setting over a wider range in the ratio of 3 to 1 as well as to make independent adjustment of a definite value of the current pick-up within a wide range. By using a power directional relay without voltage restraint in combination with an independent directly actuating time-delay tripping relay with independent adjustment of the time delay and the current setting, a much more flexible protective system is obtained and at the same time an extremely high reliability of protection secured.

With this combination of directional relay, starting relays and carrier tripping relays, high speed relaying of 3 cycles or less can be obtained for internal faults.

Individual current starting and carrier tripping relays are employed so as to give greater flexibility for each individual application in making predetermined definite settings in pick-up current as well as timing.

The back-up tripping relays are of the induction type with inverse time characteristics. These are generally set to operate from 30 to 90 cycles to cascade with other back-up protective relays on the system. These relays may be of the type IAC—11 of the General Electric Company.

In Fig. 3 is shown a second type of protective system of our invention which has a more sensitive ground fault protection than the system of Fig. 2 to take care of applications where the minimum ground currents are less than twice the normal line current over the line section. This is achieved by limiting the control actions of the power directional relay PD as used in the system of Fig. 2 only to the phase current responsive back-up relays BT, carrier time-delay tripping relays CT and instantaneous-starting relays IP, and providing an independent instantaneous high speed ground directional relay GD for controlling the actions of the ground current responsive back-up relay BTG, carrier time-delay tripping relay CTG and instantaneous ground starting relay IGK, the latter relay being provided with interlocking contacts that, in case of a ground fault, transfers the control of the carrier transmission from the phase power directional relay to the ground directional relay.

The ground directional relay GD is similar in action to the power directional relay PD and closes at high speed within about 1 cycle.

The instantaneously-acting ground starting relay IGK is similar in construction to the starting relay IG, and is provided with a second set of contacts 26 which, in case of a ground fault, instantaneously transfers the control of the carrier transmission from the phase power directional relay PD to the ground directional relay GD.

The system shown in Fig. 3 supplies in addition to phase fault protection given by the system of Fig. 2, a ground fault protection which takes care not only of conditions where the ground current is larger than twice the normal load currents over the line section, but also with conditions met with in many cases where the minimum ground fault currents are less than twice the normal load currents over the line section.

As seen in Fig. 3, the power directional relay PD, the carrier tripping phase relays CT, the back-up tripping phase relays BT and the instantaneous starting phase relays IP are arranged and connected in exactly the same way as the corresponding elements of the system in Fig. 2.

The instantaneous directional ground relay GD has a current coil 61 connected in series with the current coils of the ground relays BTG, CTG and IGK in the ground lead 37 of the current transformer windings 35 to be actuated by the zero sequence currents flowing in the line. The ground directional relay GD has also a potential coil 62 which, in case of a ground fault, receives zero sequence voltage from three single phase auxiliary potential transformers AT having primary windings 63 connected in star and secondary winding 64 connected in delta.

The ground directional relay GD is arranged to be actuated to close its tripping contacts 66 and to open its contacts 67 upon flow of zero sequence ground current in the direction from the bus bar Bm into the line section Lmnl, and to open its tripping contacts 66 and to close its transmitter circuit contacts 67 in case the zero sequence ground current flows in opposite direction from the line Lmnl into the bus bars Bm, this being also the normal position of the relay for no zero sequence currents. The current coil 61 and the potential coil 62 of the ground directional relay act inductively on a disc to rotate it in one or the opposite direction, depending upon the direction of the zero sequence current flow corresponding to the currents and voltage applied to the actuating coils 61 and 62. A condenser C is provided in series with the potential coil 62 to obtain maximum torque at a predetermined power factor. Type IBC—22 directional ground relay of the General Electric Company may be used for this service.

The instantaneous ground current starting relay IGK has its actuating coil 24 connected in the residual ground lead 37 and has contacts 25 that are normally open and contacts 26 that are normally closed. Contacts 25 close and contacts 26 open only when the zero sequence current in the line Lmnl has reached a predetermined value. When contact 26 is opened, the control of carrier energy transmission is taken away from the directional power relay PD and is then controlled by the ground fault occurring on the transmission system causing sufficient zero sequence current to operate the instantaneous ground current starting relay IGK, carrier energy will only be transmitted at station M when the contacts 67 of the ground directional relay GD closes, which occurs only when the direction of flow of zero sequence current is from the line Lmnl into the bus bars Bm.

Trip circuit contacts 66 of the ground directional relay GD are normally open and close only when the direction of flow of zero sequence current in the line section Lmnl is from the bus bars Bm into the line section Lmnl. Since contacts GD/66 are connected in series with the contacts 21 of the definite-time-delay relay CTG and in series with contacts 34 of the receiver relay RC and independently in series with contacts 23 of the inverse time-delay current relay BTG, also connected in the residual current lead 37, the circuit breakers Cmn will not trip unless the direction of flow of zero sequence current is from the bus bars Bm into the line Lmnl. The ground directional relay GD closes its transmitter circuit contacts GD/67 when ground current flows from line into the bus actuating the transmitter T only if ground starting relay IGK closes its contacts IGK/25 on flow of current through coil IGK/24; and closes its tripping contacts GD/66 when ground current flows from the bus into line actuating the tripping coil 10 only if contacts CTG/21 and RC/34 are closed, or if contacts BTG/23 are closed.

Tripping of the circuit breaker trip coil 10 takes place accordingly only if a circuit including the following four alternative series relay contacts is established:
(1) PD/12, CT/21, RC/34
(2) PD/12, BT/23
(3) GD/66, CTG/21, RC/34
(4) GD/66, BTG/23

Relay actions which do not produce one of the foregoing four set-ups keep the circuit breaker from tripping.

If the local directional phase power relay PD has its tripping contact PD/12 closed indicating power flow from the bus into the line, tripping is normally delayed until the phase tripping relay CT has given its contact CT/21 a time delay for the receiver relay RC to open its contacts RC/34 in response to carrier received from the other end station of the section. If for some cause the carrier control fails to trip the breaker and the line current remains above normal, the phase directional power relay holds closed its tripping contact PD/13. The back-up relay BT will after a time delay of between 30 to 90 cycles, depending on its setting, trip the breaker.

Should the line have a ground fault and produce a ground current, the ground starting relay IGK instantaneously transfers the control of carrier transmission to the ground directional relay GD, the back-up ground relay CTG cutting off the circuit breaker if the ground current flows from the bus into line and the carrier trip ground relay CTG fails to effect the quick tripping.

The carrier equipment of the system in Fig. 3 is exactly like that of Fig. 2 and is indicated in Fig. 3 by a dotted rectangle OC.

Assuming normal line conditions and power flowing like in the system of Fig. 2, in the direction from line Lmkl over section Lmnl to section Lnol, the circuit breakers at both ends of section Lmnl will stay closed. In case of a phase to phase fault beyond station N, the instantaneous starting relays IP will close at both stations and the relays PD, BT, CT and IP at both stations will be actuated. In station M where the power flows from the bus Bm into the line Lmnl, power directional relay PD will quickly close its tripping contacts 12 preparing the tripping circuit which will trip the circuit breaker Cmnl upon closure of the carrier tripping relays CT after about 3 cycles unless carrier arriving from the station N has in the meanwhile opened the receiver relay contacts RC/34 and thus prevented the circuit breaker Cmnl from tripping. This is made possible because the power flow at station N from the line into the bus causes quick closure of the transmitter starting contacts PD/13 by the power directional relay while simultaneously the starting relay at station N instantaneously completes the transmitter starting circuit, thereby setting the transmitter quickly into action and energizing the coil RC/34 at station M before the carrier tripping relay CT closes its tripping contacts CT/21. The circuit breaker remains also closed at station N because its tripping circuit is opened by the action of the local power directional relay closing the transmitting contacts.

In case a phase to phase fault occurs within the section Lmnl, the power directional relays in both stations will quickly complete the tripping circuits of the associated circuit breakers and the carrier tripping relays CT which are set into action by the fault current will complete the tripping action within about 3 cycles, the transmitter action at both stations being stopped by the open transmitter contacts of the power directional relays.

In case the carrier current flow is not stopped by reason of a bus bar short circuit or a failure of the circuit breaker beyond the line section Lmn1, the circuit breaker at the station where there is abnormal power flow in the direction from the bus into the line will be tripped by the back-up relay BT, which will find the tripping circuit completed by the closure of the tripping contacts PD/12, thus clearing the line notwithstanding the failure of the carrier.

In case a ground fault occurs outside the line section to the right of station N, the instantaneous ground starting relay IGK at each station becomes instantaneously energized transferring at its contacts 26 and 25 the control of carrier transmission to the ground directional relay GD and its carrier tripping ground relay CTG and back-up tripping ground relay BTG, which act in the same way as the power directional relay and the phase tripping relays act in case of a phase fault, preventing tripping of the circuit breaker of the section if the ground fault is outside the section and cutting out the line section if the ground fault is within the section. The protection is also effective in cases where power flows only from one side of the line and the other side has no power, as in the case of the system of Fig. 2.

Summarizing, the relay arrangement shown in Fig. 3, which arrangement is employed in case the ground short-circuit currents on the line section are less in magnitude than twice the normal load currents taken over the line section, has the following essential and important features that make this system of protection far superior to any other system of carrier current protection heretofore proposed in obtaining greater speed of operation, greater reliability, greater flexibility, more efficient operation, ease of maintenance, and more economical installation:

(a) The arrangement by which the carrier current equipment, including transmitter, output transformer, line tuning equipment, and the accessories, are mounted in an outdoor cabinet OC next to the carrier coupling capacitor in the outdoor switchyard, and the relay control equipment is mounted on a switchboard panel in the station, makes it possible to obtain a more efficient, simplified, and reliable arrangement, in addition to obtaining a great saving in cost and space requirements.

(b) The arrangement of one instantaneous-acting power directional relay PD without voltage restraint for phase protection in coordination with two instantaneous-acting over-current starting phase relays IP directly and simultaneously actuated from the alternating phase current in the line, makes it possible to start the transmission of carrier current from 1 to 1½ cycles on an external phase to phase fault after the fault occurs. Also, on an external phase to phase fault carrier current will be received at the station where the flow of fault current is from the bus bars into the line within 1½ to 2 cycles after the fault occurs.

(c) The arrangement of one instantaneous-acting ground directional relay GD in coordination with one instantaneous-acting over-current starting relay IGK directly and simultaneously actuated from the alternating ground current in the line, makes it possible to start the transmission of carrier current from 1 to 1½ cycles on an external phase to ground fault after the fault occurs. Also, on an external fault carrier current will be received at the station where the flow of ground fault current is from the bus bars into the line within 1½ to 2 cycles after the fault occurs.

(d) The arrangement of one instantaneous-acting power directional relay PD without voltage restraint in coordination with two instantaneous-acting over-current starting relays IP and two definite-time over-current tripping relays CT directly and simultaneously actuated from the alternating phase current in the line, makes it possible on an internal phase to phase fault to cause energization of the trip coil of the circuit breakers at all terminals of the line section within 2½ to 3 cycles after the fault occurs.

(e) The arrangement of one instantaneous-acting ground directional relay GD in coordination with one instantaneous-acting over-current starting relay IGK and one definite-time over-current tripping relay CTG directly and simultaneously actuated from the alternating ground current in the line, makes it possible on an internal phase to ground fault to cause energization of the tripping coil of the circuit breakers at all terminals of the line section within 2½ to 3 cycles after the fault occurs.

(f) The arrangement of one instantaneous-acting power directional relay PD without voltage restraint in coordination with two inverse time over-current back-up tripping relays BT directly and simultaneously actuated from the alternating phase current in the line, makes it possible to obtain back-up protection for phase to phase faults in case the carrier protection fails to trip under certain special conditions.

(g) The arrangement of one instantaneous-acting ground directional relay GD in coordination with one inverse time over-current back-up tripping ground relay BTG directly and simultaneously actuated from the ground current in the line, makes it possible to obtain back-up protection in case the carrier protection fails to trip under certain special conditions.

(h) The arrangement of definite-time over-current tripping relays CT, CTG makes it possible to trip out the faulty line section with the same speed both for ground and phase to phase faults regardless of the magnitude of the fault current.

(i) The arrangement of an adjustable time lever setting on the time-delay over-current tripping relays CT, CTG makes it possible to alter the time of tripping readily to meet various operating conditions met in practice within wide dimits, that is, from 2 to 10 cycles.

(j) The arrangement of instantaneous current starting relays IP, IGK with an easy adjustable current pick-up over wide limits, namely, from a minimum value to a maximum value equal to three times the minimum value, makes it possible to set the starting relays at any predetermined value over a wide range.

(k) The arrangement of current tripping relays CT, CTG, BT, BTG equipped with current taps and an adjustable shading-pole adjustment, makes it possible to set the tripping relays for pick-up current at any predetermined value readily over a wide range, namely, from a minimum value to a maximum value equal to three times the minimum value.

(l) The relays required with this arrangement are all very simple, extremely reliable, require very little maintenance, and are rather inexpensive.

In many of the modern power network systems, conditions arise which make it impossible to set the carrier protection system employing current responsive starting and tripping relays so as to give full protection. One such condition arises where the maximum load current on the line section is nearly equal to or greater than the minimum short circuit current obtainable. This happens frequently in case of a two circuit system, where only one circuit is in operation. Even more often, conditions arise under which the normal load current on a section is very much greater than the short circuit current obtainable at one end of the line section in case of a fault on the line section. With the protective systems heretofore employed, the starting and tripping relays at both ends of a line section must be set to pick up at the same predetermined current. Since it is impracticable and undesirable to have the carrier transmitters operate almost continuously, the starting and tripping relays must be set to pick up only at large currents. As a result they fail to function when a fault occurs in such line section if the short circuit current is less than the relay settings.

Another condition frequently arising on networks are sudden load swings reaching high values in either direction, which bring about the possibility of tripping the section due to the uncertain operation of the carrier and back-up relays under such conditions.

The present invention avoids these difficulties by employment of voltage relays to start the carrier transmission and the operation of the phase tripping relays of the carrier and back-up protection. This mode of phase protection depends on the maintenance of the three phase to phase voltages at the normal value and the utilization of the drop of a phase voltage below a predetermined value of normal voltage for the starting of the carrier tripping and back-up tripping phase relays to cut out the faulty line section. The drop of the phase voltage was found to be a much more definite indication that a phase to phase fault exists on system than the change in the magnitude of the line current. By the use of the under-voltage relays, a very flexible protection system is obtained which permits choice of settings that will take care of practically any condition that may arise on the system.

This system of phase protection by under-voltage relays in combination with a sensitive relay for ground protection which takes over the control of the carrier transmission when a ground fault exists on the system assures complete protection under all conditions. It enables obtaining of high sensitivity protection on double circuit lines where one circuit carries at times the full load which is larger than the short circuit current that could normally occur on line and under similar conditions where the short circuit current from one station is less than the normal line current or abnormal currents caused by sudden load swings due to instability.

Complete protection under such conditions can be obtained only if on the phase faults control of the tripping is made dependent only on the voltage of the system and the effect of the current by itself on the starting of the tripping due to phase faults is eliminated. With this system the magnitude of the load that may be taken over a line section is unlimited so long as the phase voltages at the station do not drop below a predetermined value for which the under-voltage relays have been set.

The arrangement of a station at one end of a line section having such protection system is shown in Fig. 4. It comprises all the elements of the carrier equipment, the power directional relay PD, the phase tripping relays CT, BT, as well as the ground directional relay GD, the ground current responsive relays CTG, BTG, IGK and carrier actuated receiver trip cut-out relay RC and the various connections therebetween, like those shown in connection with the system of Fig. 3.

The mode of starting the tripping of the line circuit breaker in response to a phase to phase fault is, however, entirely changed. In accordance with the invention, the tripping of the circuit breaker in case of a phase to phase fault is subject to the control of a set of under-voltage relays IE, each having an actuating voltage coil 74 arranged to close quickly two independent sets of contacts 75 and 76 when the voltage applied to the voltage coils drops below a predetermined value. The instantaneously-acting under-voltage relays IE may be of the plunger type and are constructed like the type SV plunger relays of the Westinghouse Company.

The voltage coils 74 of the under-voltage relays IE are connected to the low voltage bus bars of the three star-connected potential transformers 40 which also supply the voltage coils 15 of the power directional relay PD of the station.

An instantaneously-acting phase starting tripping relay SC having an actuating voltage coil 77 opens quickly two independent sets of contacts 78 and 79 upon energization of its actuating coil 77 from the local D. C. bus bars A, B when the contacts 76 of the under-voltage relays are in closed position. The upper contacts 75 of the under-voltage relay IE establish in the downward closed position a circuit 80 between one of the lower contacts 26 of the instantaneous ground current starting relay to the transmitter circuit contacts 13 of the power directional relay PD so as to prepare a circuit to the transmitter when the power directional contacts PD/13, the instantaneous ground starting relay contacts IGK/26 and the under-voltage relay contacts IE/75 are closed.

The instantaneous under-voltage relays IE have their contacts 75 and 76 normally open and are closed only when one of the phase to phase voltages at the bus bars B$m$ fall below a predetermined value of normal voltage. For instance, the instantaneous voltage relays IE may be set to close their contacts when one of the phase to phase voltages at the bus bars B$m$ has fallen below 80% of normal voltage.

The instantaneous phase starting tripping relay SC has its contacts 78 and 79 normally closed and they are opened only when contacts 76 of the instantaneous voltage relays IE are closed. Contacts 78 and 79 of relay SC normally short circuit the current coils 20 and 22 of the time-delay over-current phase tripping relays CT and BT which are connected in the two phase wires from the current transformers 35, thus preventing actuation of these time-delay over-current relays unless one of the phase to phase voltages at the bus bars B$m$ has fallen below a predetermined value regardless of the magnitude of power flow in the line section L$mn$1.

The transmitter circuit contacts 13 of the directional power relay PD close only when the direction of power flow in the line section L$mn$1 is from the line L$mn$1 into the bus bars B$m$. Since contacts 13 of the directional power relay PD are connected in series with contacts 75 of the instantaneous under-voltage relays IE and contacts 26 of the instantaneous ground current starting relay IGK, carrier energy will not be transmitted at station M by transmitter T unless one of the phase to phase voltages at bus bars B$m$ has dropped below a predetermined value of normal voltage regardless of the direction and magnitude of the power flow in the line L$mn$l.

The tripping circuit contacts 12 of the directional power relay PD close only when the direction of power flow in line section L$mn$l is from the bus bars B$m$ into the line L$mn$l. Since contacts 12 of the directional power relay PD are connected in series with the parallel connected contacts 21 of the definite-time-delay phase carrier tripping relays CT and contacts 34 of receiver relay RC, and independently in series with the parallel connected contacts 23 of the inverse time-delay phase back-up relays BT, the circuit breaker C$mn$l will not trip unless one of the phase to phase voltages at bus bars B$m$ has dropped below a predetermined value of normal regardless of the direction and magnitude of power flow in the line L$mn$l.

The instantaneous ground current starting relay IGK, which is connected in the residual ground lead 37 of the current transformers 35, has its contacts 25 normally open and 26 normally closed. Contacts 25 close and 26 open only when the zero sequence current in the line L$mn$l has reached a predetermined value. When contacts 26 of relay IGK open, the control of carrier energy transmission is taken away from the directional power relay PD and is then controlled by the ground directional relay GD. Therefore, in case of a ground fault occurring on the transmission system causing sufficient zero sequence current to operate the instantaneous current relay IGK, carrier energy will only be transmitted at station M when the transmitter circuit contacts 67 of the ground directional relay GD closes, which occurs only when the direction of flow of the zero sequence current is from the line L$mn$l into the bus bars B$m$.

Trip circuit contacts 66 of the ground directional relay GD are normally open and close only when the direction of flow of zero sequence current in the line section L$mn$l is from the bus bars B$m$ into the line L$mn$l. Since contacts 66 on the ground directional relay GD are connected in series with contacts 21 of the definite-time-delay ground carrier tripping relay CTG and in series with contacts 34 of receiver relay RC, and independently in series with contacts 23 of the inverse time-delay current back-up relay BTG, also connected in the residual current lead 37, the circuit breaker C$mn$l will not trip unless the direction of flow of the zero sequence current is from the bus bars B$m$ into the line L$mn$l.

By designating the contacts and actuating coils of the various relays by the symbol of the particular relay over the designating numeral of the particular contact or coil of the relay, the interaction between the various relays at each circuit breaker station may be summarized as follows:

Under normal line conditions the under-voltage relays IE have their coils IE/74 energized by the phase voltages and their transmitter starting contacts IE/75, and tripping starting contacts IE/76 are open. The contacts close only if one or more of the phase voltages has dropped a predetermined amount, for instance, 20% below normal. Under normal line conditions, the carrier tripping phase relays CT and the back-up tripping phase relays BT have their coils CT/20 and BT/22 short circuited by contacts SC/78 and SC/79 of the phase starting tripping relay SC, while its coil SC/77 is de-energized by the normally open under-voltage relay tripping contacts IE/76. The contacts SC/78 and SC/79 are opened and tripping of relays CT and BT is started only upon closure of one or more of under-voltage relay contacts IE/76.

The phase power directional relay PD closes its transmitter starting contacts PD/13 when power flows from line into bus, actuating the transmitter T only if contacts IE/75 and IGK/26 are closed; and it closes its tripping contacts PD/12 when power flows from bus into line, actuating the tripping coil 10 only if contacts CT/21 and RC/34 are closed, or if contacts BT/23 is closed.

The ground directional relay GD closes its transmitter starting contacts GD/67 when ground current flows from line into bus, actuating the transmitter T only if ground starting relay IGK closed its contacts IC/25 on flow of ground current through coil IGK/24; and it closes its tripping starting contacts GD/66 when ground current flows from bus into line, actuating the tripping coil 10 only if contacts CTG/21 and RC/34 are closed or if contacts BTG/23 is closed.

Tripping of circuit breaker trip coil 10 takes place accordingly only if a circuit including the following four alternative series of closed relay contacts is established:

(1) PD/12, CT/21, RC/34
(2) PD/12, CT/23
(3) GD/66, CTG/21, RC/34
(4) GD/66, BTG/23

Relay actions which do not produce one of the foregoing four set-ups keep the circuit breaker from tripping.

If the local directional phase power relay has its tripping contact PD/12 closed indicating power flow from the bus into the line, tripping is normally delayed until the phase tripping relay CT has given its contacts CT/21 a time delay for the receiver relay RC to open its contacts RC/34 in response to carrier received from the other end station of the section. But no tripping will occur if the voltage at the station has not dropped below a predetermined value. If for some cause, the carrier control fails to trip the breaker, the line voltage drop continuing to stay below normal, the phase directional power relay PD holds closed its tripping contacts PD/12, the back-up relay will after a time delay of between 30 to 90 cycles, depending on its setting, trip the breaker. The fast carrier controlled tripping action which is usually sufficient to take care of all troubles has thus a protective backing in the phase back-up relay which finally trips the breaker if the power flow is from the busses into the line.

Should the line have a ground fault and produce a ground current, the ground relay IGK instantaneously transfers the control of carrier transmission to the ground directional relay GD. The breaker will trip from the carrier trip ground relay CTG or the back-up ground relay BTG if the carrier trip ground relay fails to effect quick tripping if the ground current flows from bus into line.

Assuming now a single circuit line, including sections L$mk$l, L$mn$l and L$no$l, the circuit breakers at each station being equipped as described in connection with Figs. 4 and 5 hereinabove, the operation of the system will be as follows:

Let it be assumed that the transmission line sections are all intact and that most of the time there is normal power flow along the transmission line from line sections $Lmk$| by way of station M through line sections $Lmn$| through station N into line section $Lno$|, and from there through to other stations. So long as the magnitude of power flow over line sections $Lmn$| is not sufficient to drop the phase voltages at bus bars $Bm$ at station M, or $Bn$ at station N below a predetermined value, no carrier current will be transmitted or received at either station, nor will any circuit breakers at either station trip.

If a phase to phase fault occurs on the line section $Lno$| beyond station N, immediately one of the phase to phase voltages at the bus bars $Bm$ and $Bn$ drops sufficiently to operate one or more of the voltage relays IE at both stations M and N. Further, an abnormal current flow will ensue from line sections $Lmk$| through line $Lmn$| and the portion of the line section leading from station N to the point of short circuit on line $Lno$|. This abnormal current will instantaneously actuate the time-delay phase overcurrent relays BT and CT at each of the circuit breakers $Cmn$| and $Cnm$| at both stations M and N, initiating their contact closure movements. At station M contacts 12 of the directional power relay PD will close, while contacts 13 will open, since the power flow is from the bus bars $Bm$ into the line $Lmn$|; hence, no carrier energy will be transmitted by transmitter T at station M. At station N contacts 13 of the directional power relay PD will close, thereby causing carrier energy to be transmitted by transmitter T at station N, and contacts 12 of the directional power relay PD will open, thereby opening up the tripping circuit of the circuit breaker at station N. At station M the carrier energy transmitted by station N will be received by receiver R which will operate the receiver relay RC, thus opening up the tripping circuit from the current relay CTC and preventing circuit breaker $Cmn$| from opening up. However, the circuit breaker $Cmn$| will be tripped by the back-up tripping phase relays CTB after a predetermined time, this time being set to cascade properly with the tripping relays on breaker $Cno$| at station N. The back-up relays BT if properly set do not function unless the tripping relays for circuit breaker $Cno$| fail to function.

Should the fault on line section $Lno$| be a phase to ground fault instead of a phase to phase fault, then a zero sequence current will flow from station M through line $Lmn$|, through station N, through line $Lno$| to the fault. Then at station M the instantaneous current relay IGK will operate to open its contacts 26 to take the control of carrier transmission away from the power directional relay PD, and contacts 25 will close but contacts 67 of the ground directional relay GD will open, since the direction of the zero sequence current flow is from the bus bars $Bm$ into the line section $Lmn$|; hence, no carrier energy will be transmitted by station M. At station N the instantaneous current relay IGK will operate to open its contacts 26 to take the control of the carrier transmission away from the power directional relay PD and contacts 25 will close and, in addition, the contacts 67 of the ground directional relay GD will close, since the direction of flow of the zero sequence current at station N is from the line $Lmn$| into the bus bars $Bn$; hence, carrier energy will be transmitted by transmitter T at station N. Contacts 66 of the ground directional relay GD will open, since the direction of flow of the zero sequence current is from the line $Lmn$| into the bus bars $Bn$. Hence, the tripping circuit of the circuit breaker at station N will be opened, thereby preventing the tripping of the circuit breaker. At station M the carrier energy transmitted by station N will be received by receiver R which will operate the receiver relay RC, thus opening up the tripping circuit from the time-delay current relay CTG connected in the residual current lead 37 and preventing circuit breaker $Cmn$| from opening up. However, circuit breaker $Cmn$| will trip from the back-up ground relay BTG which is connected in the residual current lead 37 after a predetermined time, this time being set to cascade properly with the tripping relays on breaker $Cno$| at station N. The current relay BTG connected in the residual circuit current lead 37 acts as the back-up protective ground relay and, if properly set, does not function unless the tripping relays for circuit breaker $Cno$| fail to function.

If now a phase to phase fault occurs on the line section $Lmn$| between stations M and N, immediately one of the phase to phase voltages at the bus bars $Bm$ and $Bn$ drop sufficiently to operate the voltage relays IE at both stations M and N. Further, an abnormal current flow will ensue from the bus bars $Bm$ of station M and $Bn$ of station N into the line section $Lmn$| to the point of fault. This abnormal current will immediately actuate the tripping phase relays BT and CT at both stations M and N, initiating their contact closure movement. At both stations M and N contacts 13 of the directional power relays PD will open, thereby preventing the transmission of carrier energy at both stations. Further, contacts 12 of the directional power relays PD will close at both stations M and N and contacts 34 of receiver relay RC will remain closed since no carrier is received and after a sufficient time has elapsed, for the contacts 21 of the phase tripping relays CT to have closed, the circuit breakers at both stations M and N will trip.

Should the fault on line section $Lmn$| be a phase to ground fault instead of a phase to phase fault, then a zero sequence current will ensue from the bus bars $Bm$ of station M and $Bn$ of station N into line $Lmn$| to the point of fault. Then at stations M and N the instantaneous current relays IGK will operate to open their contacts 26 to take the control of carrier transmission away from the power directional relay PD, and contacts 25 will close but contacts 67 of the ground directional relays GD will open, since the direction of zero sequence current flow at both stations is from the bus bars into the line section $Lmn$|. Hence, no carrier energy will be transmitted by either station. Contacts 66 of the ground directional relays GD at both stations will close, since the direction of flow of zero sequence current at both stations is from the bus bars into the line and the circuit breakers at both stations M and N will trip as soon as the contacts 21 of the carrier trip ground relays connected in residual lead 37 have closed their contacts, since contacts 34 of the receiver relays RC will remain closed due to no carrier being received at either station.

Summarizing, the relay arrangement shown in Fig. 4, which arrangement is essential where the actual load currents taken over the line section are in excess of the minimum short-circuit currents obtainable, has the following essential and important features that make this system of protection far superior to any other system of carrier current protection heretofore proposed in obtaining greater speed of operation, greater reliability, greater flexibility, more efficient operation, ease of maintenance, and more economical installation:

(a) The arrangement by which the carrier current equipment, including transmitter, output transformer, line tuning equipment, and the accessories, are mounted in an outdoor cabinet OC next to the carrier coupling capacitor in the outdoor switchyard, and the relay control equipment is mounted on a switchboard panel in the station, makes it possible to obtain a more efficient, simplified, and reliable arrangement, in addition to obtaining a great saving in cost and space requirements.

(b) The arrangement of one instantaneous-acting power directional relay PD without voltage restraint in coordination with three instantaneous-acting under-voltage starting relays IE directly and simultaneously actuated from the alternating phase currents and line voltages, makes it possible to start the transmission of carrier current from 1 to 1½ cycles on an external phase to phase fault after the fault occurs. Also, on an external phase to phase fault carrier current will be received at the station where the flow of fault current is from the bus bars into the line within 1½ to 2 cycles after the fault occurs.

(c) The arrangement of one instantaneous-acting ground directional relay GD in coordination with one instantaneous-acting over-current starting relay IGK directly and simultaneously actuated from the alternating ground current in the line, makes it possible to start the transmission of carrier current from 1 to 1½ cycles on an external phase to ground fault after the fault occurs. Also, on an external fault carrier current will be received at the station where the flow of ground fault current is from the bus bars into the line within 1½ to 2 cycles after the fault occurs.

(d) The arrangement of one instantaneous-acting power directional relay PD without voltage restraint in coordination with three instantaneous-acting under-voltage starting relays IE, one starting tripping relay SC, and two definite-time over-current tripping relays CT directly and simultaneously actuated from the alternating phase currents and line voltages, makes it possible on an internal phase to phase fault to cause energization of the trip coil of the circuit breakers at all terminals of the line section within 2½ to 3 cycles after the fault occurs.

(e) The arrangement of one instantaneous-acting ground directional relay GD in coordination with one instantaneous-acting over-current starting relay IGK and one definite-time over-current tripping relay CTG directly and simultaneously actuated from the alternating ground current in the line, makes it possible on an internal phase to ground fault to cause energization of the tripping coil of the circuit breakers at all terminals of the line section within 2½ to 3 cycles after the fault occurs.

(f) The arrangement of one instantaneous-acting power directional relay PD without voltage restraint in coordination with three instantaneous-acting under-voltage starting relays IE, one starting tripping relay SC, and two inverse time over-current back-up tripping relays BT directly and simultaneously actuated from the phase current and line voltages, makes it possible to obtain back-up protection in case the carrier protection fails to trip under certain special conditions.

(g) The arrangement of one instantaneous-acting ground directional relay GD in coordination with one inverse time over-current back-up tripping ground relay BTG directly and simultaneously actuated from the ground current in the line, makes it possible to obtain back-up protection in case the carrier protection fails to trip under certain special conditions.

(h) The arrangement of one instantaneous-acting power directional relay PD without voltage restraint in coordination with three instantaneous-acting under-voltage starting relays IE and one instantaneous starting tripping relay SC directly and simultaneously actuated from the phase current and line voltages, makes it possible to transmit any load over the line section regardless of its magnitude so long as the phase to phase voltages at the station bus bars have not dropped below a predetermined value.

(i) The arrangement of definite-time over-current tripping relays CT, CTG, makes it possible to trip out the faulty line section with the same speed both for ground and phase to phase faults regardless of the magnitude of the fault current.

(j) The arrangement of an adjustable time lever setting on the time-delay over-current tripping relays CT, CTG, makes it possible to alter the time of tripping readily to meet various operating conditions met in practice within wide limits, that is, from 2 to 10 cycles.

(k) The arrangement of instantaneous current starting relays IP, IGK with an easy adjustable current pick-up over wide limits, namely, from a minimum value to a maximum value equal to three times the minimum value, makes it possible to set the starting relays at any predetermined value over a wide range.

(l) The arrangement of current tripping relays CT, CTG, BT, BTG equipped with current taps and an adjustable shading-pole adjustment, makes it possible to set the tripping relays for pick-up current at any predetermined value readily over a wide range, namely, from a minimum value to a maximum value equal to three times the minimum value.

(m) The relays required with this arrangement are all very simple, extremely reliable, require very little maintenance, and are rather inexpensive.

The invention is not limited to the details and forms of arrangement described hereinabove, as many modifications and variations thereof will suggest themselves to those skilled in the art. It is accordingly desired that the appended claims be given a broad construction commensurate with the scope of the invention.

We claim:

1. In a protective system for a section of an outdoor electric power transmission line including an outdoor circuit breaker and a station house for circuit breaker accessories at each end of said line section, fault responsive relay means at each section end for tripping the local circuit breaker on occurrence of a fault on the line, carrier communication means including a carrier transmitter and a carrier receiver coupled to the end of the line section for maintaining carrier communication between said section ends, lock-out relay means at each section end actuated by carrier energy received by the local receiver for selectively preventing the tripping of the local circuit breaker, power-directional relay means at each section end for controlling the operation of the local transmitter to cause tripping of said circuit breakers only upon occurrence of a fault within said line section, and a weatherproof casing enclosing the carrier transmitter of each section end located outside said station house adjacent the coupling point of the transmitter to said line section and segregating said transmitter from the relay means controlling the tripping of the local circuit breaker and the operation of the local carrier transmitter located inside said station house.

2. In a protective system for a section of an outdoor electric power transmission line including an outdoor circuit breaker and a station house for circuit breaker accessories at each end of said line section, fault responsive relay means at each section end for tripping the local circuit breaker on occurrence of a fault on the line, carrier communication means including a carrier transmitter and a carrier receiver coupled to the end of the line section for maintaining carrier communication between said section ends, lock-out relay means at each section end actuated by carrier energy received by the local receiver for selectively preventing the tripping of the local circuit breaker, power-directional relay means at each section end for controlling the operation of the local transmitter to cause tripping of said circuit breakers only upon occurrence of a fault within said line section, and a weatherproof casing enclosing the carrier transmitter and receiver of each section end located outside said station house adjacent the coupling point of the transmitter and receiver to said line section and segregating said transmitter and receiver from the relay means controlling the tripping of the circuit breaker and the operation of carrier transmitter.

3. In a protective system for a section of an outdoor electric power transmission line including an outdoor circuit breaker for disconnecting one end of said line section from said line and a station house for circuit breaker accessories, fault responsive relay means at said section end for tripping said circuit breaker on occurrence of a fault on the line, carrier communication means including a carrier transmitter and a carrier receiver coupled to said section end for communicating over said line section, lock-out relay means at said section end actuated by carrier energy received by the local receiver for selectively preventing the tripping of the local circuit breaker, power-directional relay means at said section end for selectively controlling the operation of the local transmitter in accordance with the occurrence of a fault within or outside said line section, and a weatherproof casing enclosing said carrier transmitter located outside said station house adjacent the coupling point of the transmitter to said line section and segregating said transmitter from the relay means controlling the tripping of the circuit breaker and the operation of carrier transmitter located inside said station house.

4. In a protective system for a section of an electric power transmission line including an outdoor circuit breaker for disconnecting one end of said line section from said line and a station house for circuit breaker accessories, fault responsive relay means at said section end for tripping said circuit breaker on occurrence of a fault on the line, carrier communication means including a transmitter and a carrier receiver coupled to said section end for communicating over said line section, lock-out relay means at said section end actuated by carrier energy received by the local receiver for selectively preventing the tripping of the local circuit breaker, power-directional relay means at said section end for selectively controlling the operation of the local transmitter in accordance with the occurrence of a fault within or outside said line section, and a weatherproof casing enclosing the carrier transmitter and receiver located outside said station house adjacent the coupling point of the transmitter to said line section and segregating said transmitter and said receiver from the relay means controlling the tripping of the circuit breaker and the operation of carrier transmitter located inside said station house.

5. In a protective system for a section of an outdoor electric power transmission line including an outdoor circuit breaker at one section end having tripping means for disconnecting the section from the line and a station house for circuit breaker accessories, carrier communication means including a carrier transmitter and receiver having a coupling connection to said line section end for maintaining communication over said line section, means including fault responsive relay means actuated by fault conditions affecting said line section to operate conjointly with said carrier means for selectively controlling the operation of said tripping means in accordance with the location of a fault within or outside said line section, and a weatherproof outdoor casing located outside said station house adjacent said coupling connection for enclosing and segregating said transmitter from said fault responsive relay means and the associated tripping means located in said station house.

6. In a protective system for a section of an outdoor electric power transmission line including an outdoor circuit breaker at one section end having tripping means for disconnecting the section from the line and a station house for circuit breaker accessories, carrier communication means including a carrier transmitter and receiver having a capacitive coupling connection to said line section end for maintaining communication over said line section, means including fault responsive relay means actuated by fault conditions affecting said line section to operate conjointly with said carrier means for selectively controlling the operation of said tripping means in accordance with the location of a fault within or outside said line section, and a weatherproof outdoor casing located outside said station house adjacent said coupling connection for enclosing and segregating said transmitter and said receiver from said fault responsive relay means and the associated tripping means located in said station house.

7. A protective system for a section of an outdoor electric power transmission line including an outdoor circuit breaker and a station house for circuit breaker accessories at each section end for disconnecting the section from the line, carrier communication means including a carrier transmitter and receiver having a coupling connection to said line section at each section end for maintaining communication over said line section, means including fault responsive relay means at each section end actuated by fault conditions affecting said line section to operate conjointly with said carrier means for selectively opening said circuit breakers only upon occurrence of a fault within said line section, and a weatherproof outdoor casing located outside said station house adjacent said coupling connection for enclosing and segregating said transmitter from said fault responsive relay means located in said station house 8. A protective system for a section of an outdoor electric power transmission line including an outdoor circuit breaker and a station house for circuit breaker accessories at each section end for disconnecting the section from the line, carrier communication means including a carrier transmitter and receiver having a capacitive coupling connection to said line section at each section end for maintaining communication over said line section, means including fault responsive relay means at each section end actuated by fault conditions affecting said line section to operate conjointly with said carrier means for selectively opening said circuit breakers only upon occurrence of a fault within said line section, and a weatherproof outdoor casing located outside said station house adjacent said capacitive coupling connection for enclosing and segregating said transmitter and said receiver from said fault responsive relay means located in said station house.

9. In a protective system for a section of a high voltage three-phase electric power transmission line system extending between two remote generating stations having line interrupting means at each section end including tripping means for tripping said interrupting means to disconnect the section from the line upon actuation of said tripping means, current and voltage transforming means at each section end connected to said line for supplying transformed currents and voltages corresponding in magnitude and phase to the currents and voltages of the three line phases, fault-responsive time action relay means at one section end having at least two relay actuating elements individually connected through said transforming means to different line phases and individually energized by currents from different line phases flowing in the three line phases for actuating said tripping means upon occurrence of a fault on said line, a carrier oscillation transmitter at the other section end, a carrier oscillation receiver at said one section end tuned to the frequency of said transmitter, power directional relay means at said other section end having three relay driving elements individually connected through said transforming means to the different line phases and individually energized by line currents and voltages corresponding in magnitude and phase to the currents and voltages of the three different line phases for selectively controlling the operation of said transmitter in accordance with direction of the resultant power flow in the three line phases, and means controlled by said carrier oscillation receiver and operative within the time action of said fault-responsive relay means to prevent the actuation of said tripping means by the action of said fault-responsive relay means upon occurrence of a fault outside said line section.

10. In a protective system for a section of a high voltage three-phase electric power transmission line system extending between two remote generating stations having line interrupting means at each section end including tripping means for tripping said interrupting means to disconnect the section from the line upon actuation of said tripping means, current and voltage transforming means at each section end connected to said line for supplying transformed currents and voltages corresponding to the three currents and voltages of the three line phases, fault-responsive time action relay means at one section end having at least two phase relay actuating elements and a ground relay actuating element individually connected through said transforming means to different line phases and individually energized by currents from different line phases flowing in the three line phases for actuating said tripping means upon occurrence of a fault on said line, a carrier oscillation transmitter at the other section end and a carrier oscillation receiver at said one section end tuned to the frequency of said transmitter, power directional relay means at said other section end having three relay driving elements individually connected through said transforming means to different line phases and individually energized by line currents and voltages from different line phases for selectively controlling the operation of said transmitter in accordance with direction of the resultant power flow in the three line phases, and means controlled by said carrier oscillation receiver and operative within the time action of said fault-responsive relay means to prevent the actuation of said tripping means by the action of said fault-responsive relay means upon occurrence of a fault outside said line section.

PHILIP SPORN.
CHARLES ALBERT MULLER.